United States Patent [19]

Ikeda

[11] Patent Number: 5,313,861
[45] Date of Patent: May 24, 1994

[54] WORKPIECE EXCHANGING SYSTEM

[75] Inventor: Yoshiaki Ikeda, Yamanashi, Japan

[73] Assignee: Fanuc Ltd., Minamitsuru, Japan

[21] Appl. No.: 972,354

[22] PCT Filed: Dec. 11, 1990

[86] PCT No.: PCT/JP90/01620

§ 371 Date: Aug. 12, 1991

§ 102(e) Date: Aug. 12, 1991

[87] PCT Pub. No.: WO91/08851

PCT Pub. Date: Jun. 27, 1991

Related U.S. Application Data

[63] Continuation of Ser. No. 741,529, Aug. 12, 1991, abandoned.

[30] Foreign Application Priority Data

Dec. 15, 1989 [JP] Japan .................. 1-325600

[51] Int. Cl.⁵ .............................. B23B 1/00
[52] U.S. Cl. ........................ 82/1.11; 82/118;
     82/124; 82/129; 318/632; 364/474.12
[58] Field of Search ............ 82/1.11, 118, 124, 129;
     364/474.11, 474.17, 474.18; 318/568.11, 632;
     279/111

[56] References Cited

U.S. PATENT DOCUMENTS

| | | | |
|---|---|---|---|
| 4,101,817 | 7/1978 | Maeda et al. | 318/632 |
| 4,682,089 | 7/1987 | Tamari | 364/474.12 |
| 4,909,521 | 3/1990 | Ovanin | 279/111 |
| 5,058,029 | 10/1991 | Uemura | 82/129 |

FOREIGN PATENT DOCUMENTS 16301  1/1989  Japan .................... 82/124

Primary Examiner—Z. R. Bilinsky
Attorney, Agent, or Firm—Staas & Halsey

[57] ABSTRACT

The present invention provide a workpiece exchanging system in a CNC lathe having two spindle heads. The workpiece is machined by a spindle head A (S1, S2), a spindle head B is moved toward the spindle head A while loading a servo motor controlling a feed axis for the spindle head B to a torque limit (S3, S4). An error (d) of the feed axis is detected when this movement is completed, and it is determined whether the workpiece is normally clamped by a chuck mounted at a spindle head (S5, S7). The workpiece is machined as it is in accordance with the error of the feed axis (S9), is machined after being moved by a coordinate corresponding to the error (S8), an alarm is displayed, and the CNC is stopped (S10).

2 Claims, 4 Drawing Sheets

WORKPIECE EXCHANGING SYSTEM

This application is a continuation of application Ser. No. 07/741,529, filed Aug. 12, 1991, now abandoned.

TECHNICAL FIELD

The present invention relates to a workpiece exchanging system, and in particular to a CNC (numerical control device) lathe including at least two spindle heads.

BACKGROUND ART

Conventionally, a four-axis lathe including two spindle heads and two tool posts is widely used for a more effective machining of a workpiece. In the four-axis lathe, a turning is carried out by a chuck of one spindle head, and when that machining is finished, the workpiece is clamped by a chuck of another spindle head and a turning of the surface opposite to the machined side is carried out.

A brief description of the prior art is now given, with reference to the attached drawings. FIGS. 4 (a), (b) and (c) are respectively diagrams illustrating the exchanging the workpiece in a CNC lathe having two spindle heads. FIG. 4 (a) shows an outline of a workpiece exchanging operation. In the FIG. 4 a chuck A2 is mounted at a spindle head A1 and is clamping the workpiece 5, and when the machining thereof by a tool post A3 is completed, a spindle head B6 is moved close to the workpiece 5, and the workpiece 5 is clamped by a chuck B7 mounted at the spindle head B6. At that time, the chuck A2 is opened, the spindle head B6 is returned to the machining position, and the workpiece 5 is machined by a tool post 8. FIG. 4 (b) shows the state wherein the workpiece 5 is normally clamped by the chuck B7 of the spindle head B6, and FIG. 4 (c) shows the state wherein the workpiece 5 is not normally clamped by the chuck B7 of the spindle head B6.

According to a workpiece exchanging system in a conventional CNC lathe having two spindle heads a clearance exists between the workpiece and the chuck. For example, when a foreign substance has intruded between the workpiece and the chuck, the workpiece is again machined, and as a result, the finished workpiece is not accurately machined to a desired dimension. In addition, on occasion, problems arise such that the workpiece is not correctly clamped by the chuck, and thus falls out during the machining, or the tool and the workpiece come into violent contact due to a quick feeding thereof.

DISCLOSURE OF THE INVENTION

The present invention has been made in view of the foregoing problems, and a main object of the present invention is to provide a workpiece exchanging system in a CNC lathe having two spindle heads, which ensures that the chucks thereof accurately clamp the workpiece, whereby a precise workpiece machining is accomplished.

To solve the above-mentioned problems, a workpiece exchanging system according to the present invention is characterized by a CNC lathe having at least two spindle heads, and comprises the following steps;

machining the workpiece with a first spindle head, feeding a second spindle head toward the first spindle head while a servo motor is controlled by the feeding of the second spindle head while being loaded, detecting any error occurring in the servo motor at the time that the movement of the second spindle head is completed.

and determining whether the workpiece has been normally clamped by a chuck mounted at the second spindle head.

Namely, when the turning of the workpiece by the first spindle head is finished, the second spindle head is moved to a machining position while loading the servo motor for a feed axis of the second spindle head with a torque limit. Next, an error at the servo motor is detected, and then it is determined whether the workpiece has been normally clamped by the second spindle head. According to whether or not an error is detected, the workpiece is machined as it is or is machined after being moved by a coordinate corresponding to the detected error. The CNC lathe is stopped by the sounding of an alarm.

BEST MODE OF CARRING OUT THE INVENTION

An embodiment of the present invention will be hereinafter described in more detail with reference to the attached drawings.

Figure 3:
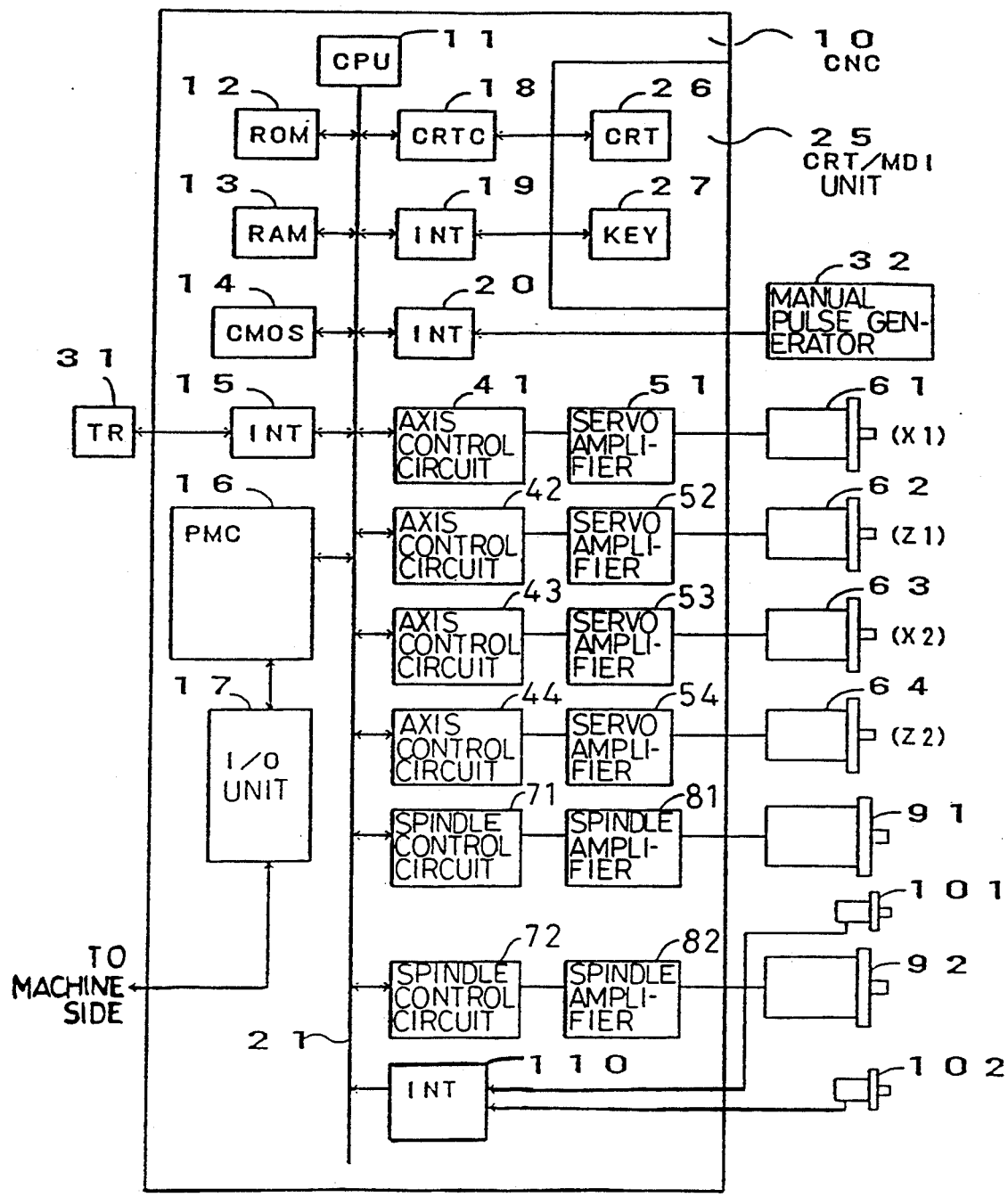
FIG. 3 is a block diagram showing hardware of a numerical control device for accomplishing the present embodiment.

FIG. 3 is a block diagram illustrating hardware of the numerical control device (CNC) for carrying out the system of this invention. As shown in FIG. 3, reference numeral 10 denotes a numerical control device which includes a processor 11 (CPU) which is a main controller of the numerical control device (CNC) 10 as a whole. The processor 11 reads out system programs stored in a ROM 12 through a bus 21 and controls the numerical control device (CNC) 10 as a whole in accordance with the system programs. Temporary computing data, display data and the like are stored in a RAM 13, which is a SRAM. Compensation values for machine tool and pitch errors, NC programs, parameters and the like are stored in a CMOS 14. Note, since the CMOS 14 is backed up by a battery (not shown in FIG. 3) and is a nonvolatile memory, the above-mentioned data can be kept as it is even though a power supply to the numerical control device (CNC) 10 is cut off.

An interface 15 acts as an interface to an external device 31, and is connected to the external device 31 such as a paper tape reader, a paper tape puncher, a paper tape reader/puncher and the like. The NC program is read by the paper tape reader, and then a processing program edited in the numerical control device (CNC) 10 is output to the paper tape puncher.

A PMC (Programmable Machine Controller) 16 is included in the CNC 10 and controls a machine side by using a sequence program created by a ladder diagram method. Namely, M, S and T function commands output from the processing program are converted into necessary signals for the machine side, by the sequence program, and are output to the machine side through an I/O unit 17. Magnetic solenoids at machine side are driven by the output signals, for operating a hydraulic valve, a pneumatic valve, an electric actuator and the like. Further, signals from a limit switch at the machine side and a switch at a machine operator control panel are appropriately processed via the I/O unit, and are transmitted to the processor 11.

A graphic control circuit 18 converts digital data, such as the current position of each axis, an alarm, parameters, image data and the like, into image signals and outputs same. The image signals are transmitted to a display device 26 of a CRT/MDI unit 25 and are displayed thereon. An interface 19 receives data via a keyboard 27 in the CRT/MDI unit 25, and transmits same to the processor 11.

An interface 20 is connected to a manual pulse generator 32 and receives pulses generated by the manual pulse generator 32. The manual pulse generator 32 is mounted on the machine operator control panel and is used for precisely positioning machine operating parts by a manual action.

Axis control circuits 41 to 44 receive movement commands for each axis from the processor 11, and output the received commands to servo amplifiers 51 to 54. The servo amplifiers 51 to 54 receive the movement commands and operate servo motors 61 to 64 at each axis. A pulse coder for detecting positions is included in the respective servo motor 61 to 64, and the positioning signals output by the pulse coder are fed back as a pulse train. If necessary, a linear scale can be used as the positioning detector. Moreover, speed signals can be generated by an F/V (frequency/velocity) conversion of the pulse train. Note, feedback line for the positioning signals, and a feedback line for speed signals are not shown in FIG. 3.

The servo motors 61 and 62 control a tool post A and a spindle head A, and the servo motors 63 and 64 control a tool post B and a spindle head B. Further, a torque limiter is disposed in the servo motor 64, and when exchanging a workpiece from the spindle head A to the spindle head B, the workpiece is moved to the spindle head B through a feed axis and is clamped under an appropriate pressure. When the spindle head B clamps the workpiece, any error of the feed axis is detected. This error is, for example, the difference between a programmed position of the spindle head B and an actual position thereof, and is stored in the memory. When the workpiece is machined, the amount of a coordinate of a movement thereof corresponding to the stored error is applied. The error stored in the memory is followed until the next machining cycle.

Spindle control circuits 71 and 72 receive a spindle rotation command and orientation command, and output a spindle speed signal to spindle amplifiers 81 and 82. The spindle amplifiers 81 and 82 receive this spindle speed signal, and then rotate spindle motors 91 and 92 at the commanded ratation speed. The spindle motor 91 and 92 are linked respectively with the spindle head A and the spindle head B by a gear or a belt (not shown).

Further, position coders 101 and 102 are linked respectively with the spindle motors 91 and 92 by a gear or a belt (not shown). Accordingly, the position coders 101 and 102 rotate the spindle head A and B synchronously and output a feedback pulse, and the output feedback pulse is read by the processor 11 through an interface 110. The tool posts A and B are moved synchronously by the feedback pulse with the spindle motors 91 and 92, and carry out a machining of e.g. a thread cutting.

Figure 2A:
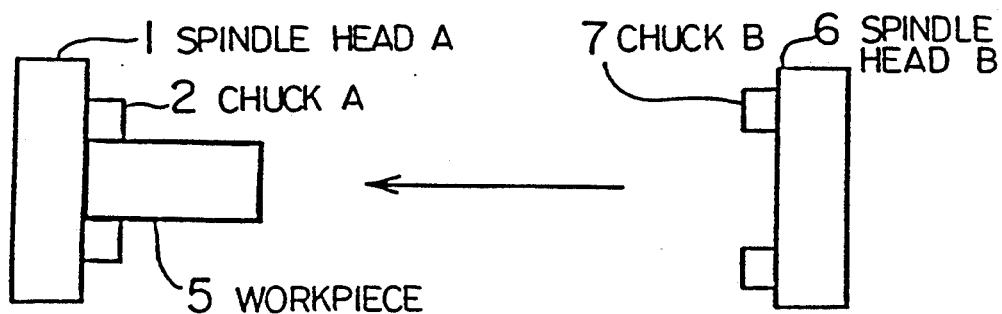
FIGS. 2 (a), (b) and (c) are diagrams illustrating the workpiece exchanging system according to an embodiment of the present invention.
Figure 2B:
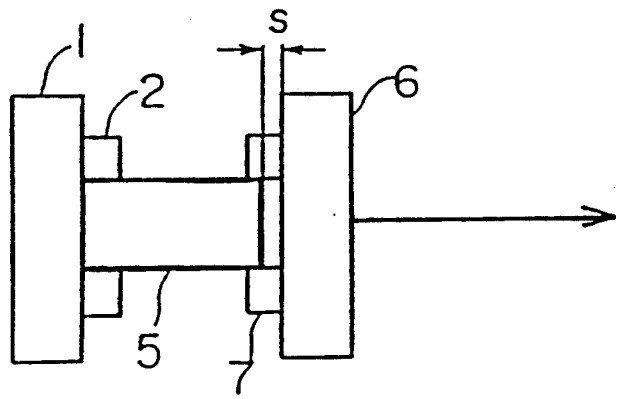
Figure 2C:
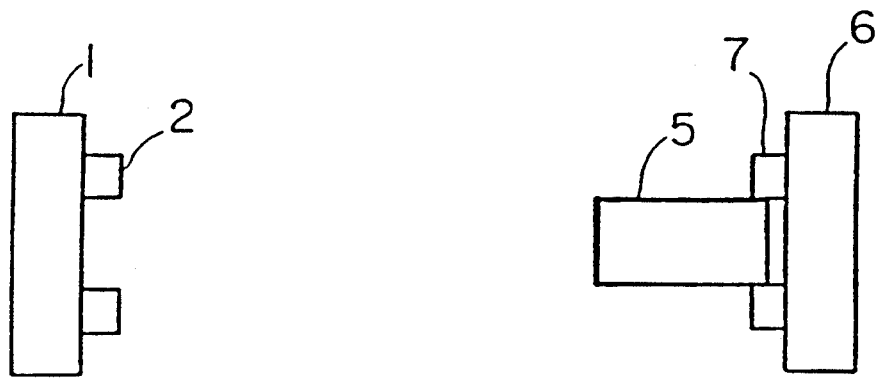
Figure 4A:
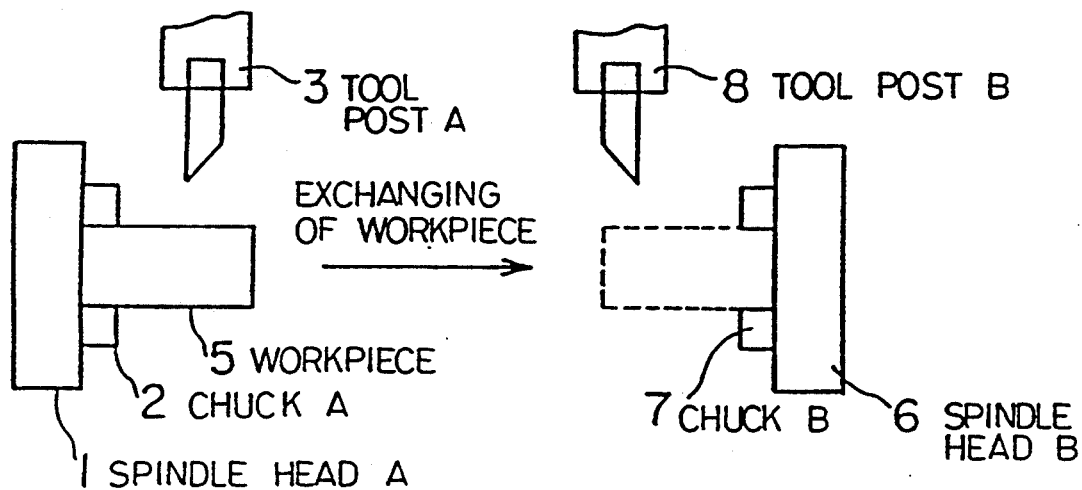
FIGS. 4 (a), (b) and (c) are diagrams illustrating an outline of the exchanging of the workpiece according to a prior art.
Figure 4B:
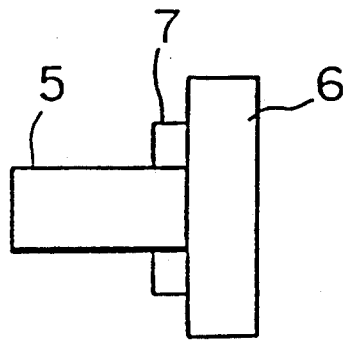
Figure 4C:
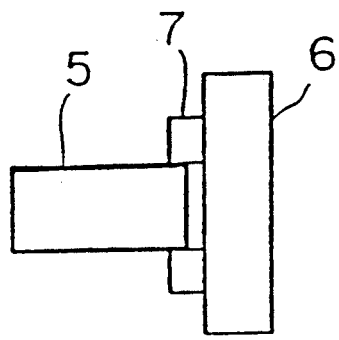

FIG. 2 (a), (b) and (c) are diagrams illustrating an embodiment of workpiece exchanging system according to the present invention. In FIG. 2 (a), (b) and (c), components corresponding to FIG. 4 are given the same reference numeral.

FIG. 2 (a) shows a condition where the workpiece 5 clamped by a chuck A2 mounted at the first spindle head A1 is machined, and the second spindle head B6 is moving toward the first spindle head A1. At this time, a chuck B7 mounted at the spindle head B6 is opened, for clamping the workpiece 5. The servo motor 64 moves the spindle head B6 under a loading torque limit.

FIG. 2 (b) shows a condition where the spindle head B6 is clamping the workpiece 5 under a constant pressure due to the limited torque operation. At this time, an error d (servo residual) of the servo motor 64 is detected. If a predetermined movement error occurring during the exchanging of the workpiece is regarded as zero, the error d of the servo motor 64 can be presented as S, i.e., a clearance between the spindle head B6 and the workpiece 5. Accordingly, if the error d is less than the first allowable value, the chuck B7 of the spindle head B6 is closed while at the same time clamping the workpiece 5, and is then moved toward the working position.

FIG. 2 (c) shows the condition where the chuck B7 of the spindle head B6, which is clamping the workpiece 5, has been returned to the initial machining position.

Figure 1:
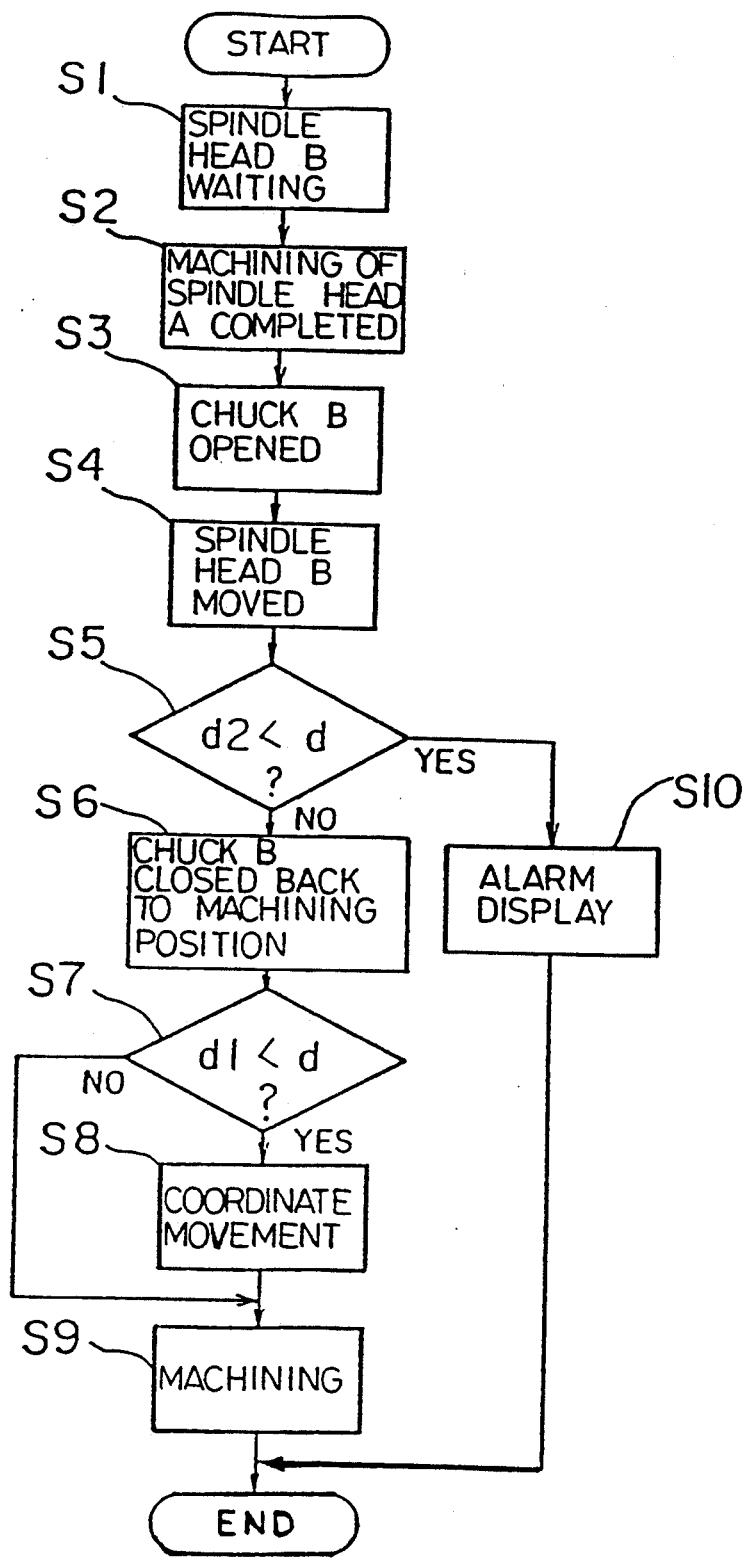
FIG. 1 is a flowchart of the workpiece exchanging system according to the present invention.

FIG. 1 is a flowchart illustrating a workpiece exchanging system according to the present invention. In FIG. 1, the numeral following the letter S represents a step number.

[S1] The spindle head B is waiting.

[S2] Machining of the workpiece by the spindle head A is completed.

[S3] The chuck B is opened.

[S4] The spindle head B is moved while at the same time clamping the workpiece under a constant pressure. Namely, a torque limit as loaded to the servo motor 64 is a feed axis for the spindle head B.

[S5] An error d of the servo motor 64 is detected.

Here, the first error allowable value is regarded as d1 and the second error allowable value is regarded as d2, and the relationship between the former and the latter is shown as d1<d2. At this stage, it is necessary to determine whether or not the error d of the feed axis is larger than the second error allowable value d2, and if it is larger, the process goes to [S10] and if it is smaller, the process goes to [S6].

[S6] The chuck B is closed while at the same time clamping the workpiece, and then returned to machining position.

[S7] It is determined whether or not the error d of the feed axis is larger than the error allowable value d1.

If it is larger, the process goes to [S7], and if it is smaller the process goes to [S9].

[S8] The feed axis is moved according to a coordinate corresponding to the error d. This movement coordinate is followed hereinafter.

[S9] The machining of the workpiece by the spindle head B is carried out.

[S10] An alarm is displayed, and the CNC is stopped. Although two allowable values such as d1 and d2 are predetermined in the above-mentioned description, alternatively, when only one allowable value is predetermined as d3, if the relationship is d<d3, the machining by the spindle head B can be carried out, and if it is d>d3, an alarm can be displayed in advance.

As described above, according to the present invention, a workpiece exchanging system in a CNC lathe having two spindle heads is characterized in that an error in the feed axis of the servo motor of the second spindle head is detected, and the machining of the workpiece can be carried out only when the workpiece is accurately clamped by the second spindle head, whereby a very precise machining of the workpiece can be obtained.

Moreover, a fracturing of tools due to an inaccurate clamping of the workpiece can be prevented.

I claim:

1. A workpiece exchanging method for a CNC lathe having at least two spindle heads, comprising the steps of:
   (a) machining a workpiece using a first spindle head;
   (b) moving a second spindle head toward the first spindle head while loading a servo motor controlling the second spindle head to a torque limit;
   (c) detecting an error of the servo motor when said moving of the second spindle head in step (b) is completed;
   (d) determining whether the workpiece is clamped by a chuck mounted at the second spindle head;
   (e) machining the workpiece using the second spindle head when the error is not greater than a first allowable value;
   (f) shifting the workpiece relative to the spindle heads in dependence upon the error when the error is more than the first allowable value and is less than a second allowable value;
   (g) displaying an alarm and stopping the CNC lathe when the error is more than the second allowable value; and
   (h) machining the workpiece using the second spindle head after said shifting in step (f).

2. A workpiece exchanging method for a CNC lathe having at least two spindle heads, comprising the steps of:
   (a) machining a workpiece using a first spindle head;
   (b) moving a second spindle head toward the first spindle head while loading a servo motor controlling the second spindle head to a torque limit;
   (c) detecting an error of the servo motor when said moving of the second spindle head in step (b) is completed;
   (d) determining whether the workpiece is clamped by a chuck mounted at the second spindle head;
   (e) machining the workpiece using the second spindle head when the error is not greater than a first allowable value;
   (f) shifting the workpiece relative to the spindle heads in dependence upon the error when the error is more than the first allowable value and is less than a second allowable value;
   (g) displaying an alarm and stopping the CNC lathe when the error is more than the second allowable value;
   (h) machining the workpiece using the second spindle head when the error is less than a third allowable value after said shifting in step (f); and
   (i) displaying an alarm and stopping the CNC lathe when the error is more than the third allowable value after said shifting.

* * * * *